June 6, 1961

R. E. MILFORD 2,987,632

MONOSTABLE MULTIVIBRATOR WITH EMITTER-FOLLOWER FEEDBACK TRANSISTOR AND ISOLATED CHARGING CAPACITOR

Filed July 18, 1958

INVENTOR.
RICHARD E. MILFORD.
BY
[signature]
ATTORNEY.

United States Patent Office 2,987,632

Patented June 6, 1961

2,987,632

MONOSTABLE MULTIVIBRATOR WITH EMITTER-FOLLOWER FEEDBACK TRANSISTOR AND ISOLATED CHARGING CAPACITOR

Richard E. Milford, Phoenix, Ariz., assignor to General Electric Company, a corporation of New York Filed July 18, 1958, Ser. No. 749,542
11 Claims. (Cl. 307—88.5)

Figure 1:
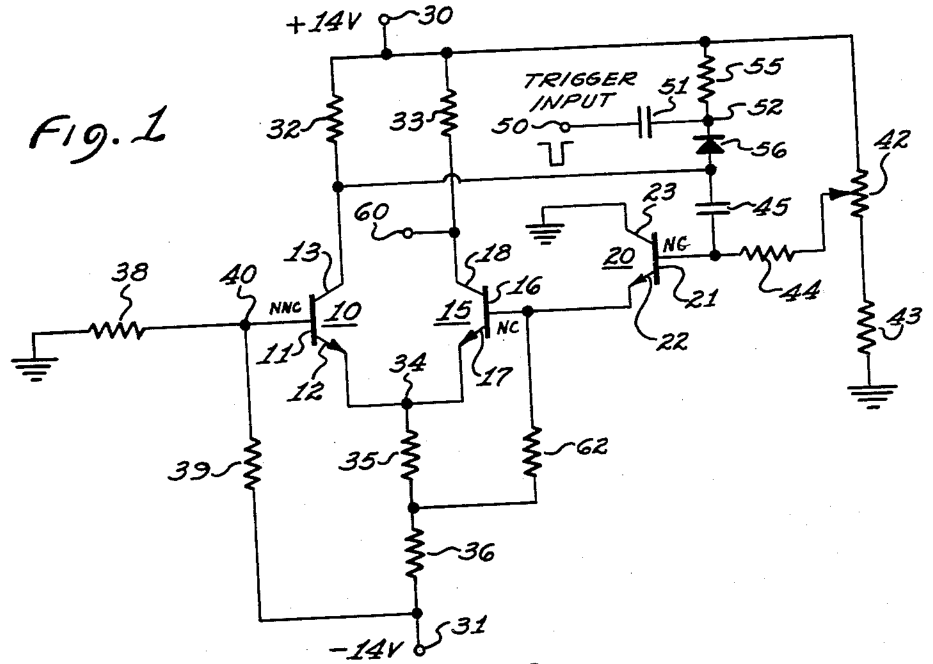

This invention relates to monostable multivibrators, and more particularly to monostable multivibrators employing transistors as the active circuit elements.

A bistable multivibrator, or flip-flop, is a circuit operable in either one of two stable states and having two input terminals, each of which corresponds with one of the two states. The flip-flop remains operating in either state until transferred to the other state by application of a trigger signal to the corresponding terminal. A monostable multivibrator is a circuit also operable in two states, but wherein only one state is stable. The monostable multivibrator transfers from its stable to its unstable state by application of a trigger signal to its sole input terminal, but returns to its stable state after an interval of time determined by circuit parameters.

An important application of the monostable multivibrator is its use as a timing device. An event in a system employing a monostable multivibrator may be initiated by the return of the multivibrator to its stable state. By controlling the duration during which the multivibrator remains in its unstable state, a controllable delay is provided between application of a trigger signal to the multivibrator and the occurrence of the event. The duration of the unstable state is controlled by adjustment of appropriate circuit parameters of the monostable multivibrator.

With advancing electronic technology, monostable multivibrators have been constructed which utilize a pair of semiconductor devices, each having a base electrode, an emitter electrode, and a collector electrode, such devices being known as transistors. Generally, the two transistors employ grounded emitter electrodes and are cross-coupled to each other so that when one device is in a condition of high conduction, the other is maintained in a condition of zero or low conduction. An appropriate source provides biasing potential whereby when the circuit is in its stable state the second transistor is in the condition of high conduction, and when the circuit is in its unstable state, the first transistor is in the condition of high conduction. A capacitor, identifiable as the "timing capacitor," is usually connected between the collector electrode of the first transistor and the base electrode of the second transistor. When the circuit is in its stable state, the timing capacitor is charged from the potential source through a first resistor, which is also connected to the collector electrode of the first transistor. When the circuit is in its unstable state, the timing capacitor is discharged through a second resistor, which is also connected to the base electrode of the second transistor. When the circuit is triggered from its stable to its unstable state, it remains in the unstable state until the capacitor has discharged to a predetermined value of potential.

It is frequently desired to have the duty cycle of the monostable multivibrator controllable over a wide range of values. The duty cycle is determined by the relationship between the duration of the unstable state and the duration of the stable state. These two durations are determined respectively by the discharge time constant and the charge time constant of the capacitor, and, consequently, by the ratio of the magnitude of the second resistor to the magnitude of the first resistor. For a large duty cycle, this ratio should be large. A large duty cycle may be effected by providing a second resistor as large as possible or by providing a first resistor as small as possible. However, in the above-described prior art monostable multivibrator, two factors place a limit on the upper value of the second resistor. First, increasing the magnitude of the second resistor tends to cut down the base current of the second transistor and eventually would cause the second transistor to be in the condition of low conduction in the stable state. Second, the relatively low input impedance at the base electrode is electrically in parallel with the second resistor so that increasing the magnitude of the second resistor substantially above this input impedance would have little effect on the duty cycle. On the other hand, decreasing the magnitude of the first resistor eventually would cause the first transistor to be in the condition of high conduction in the stable state. Thus, the duty cycle range of this prior art monostable multivibrator is severely limited.

Another disadvantage of this prior art monostable multivibrator is its sensitivity to temperature. The base electrode potential of the second transistor is determined not only by the values of the collector electrode series resistor and the source of potential, but by the parameters of the transistor. Inasmuch as these transistor parameters fluctuate with changing transistor temperature, the potential of the base electrode changes with the temperature. One terminal of the timing capacitor is connected to this base electrode. Consequently, the timing capacitor charge fluctuates with temperature changes, resulting in fluctuation of the duration of the unstable state.

It is the principal object of this invention to provide an improved monostable multivibrator employing transistors which obviates the disadvantages of prior art circuits.

Another object of this invention is to provide a monostable multivibrator employing transistors and operable over a wide range of duty cycle values.

Another object of this invention is to provide a monostable multivibrator employing transistors and having a large duty cycle.

Another object of this invention is to provide a monostable multivibrator employing transistors wherein the multivibrator operation is substantially unaffected by variations in transistor parameters.

Another object of this invention is to provide a monostable multivibrator employing transistors, wherein the multivibrator operation is substantially unaffected by ambient temperature changes.

Another object of this invention is to provide a monostable multivibrator employing transistors wherein the duration of the unstable state is substantially constant despite changes in the operating temperature of the transistors.

The foregoing objects are achieved by providing a monostable multivibrator employing three transistors. The first and second of these transistors are cross-coupled to each other and suitably biased so that when one transistor is in a condition of high conduction the other transistor is in a condition of low conduction. The emitter electrode of the third transistor, which employs a grounded collector electrode, is connected to the base electrode of the normally highly conducting second transistor. The timing capacitor is connected between the collector electrode of the first transistor and the base electrode of the third transistor. The timing capacitor discharges through a timing resistor which is also connected to the base electrode of the third transistor. This third transistor employs a grounded collector electrode, which furnishes additional current gain during the stable state. Less current is required through the timing resistor to maintain stable state conduction; consequently, the timing resistor may be made very much larger in this circuit than in prior art monostable multivibrator circuits. Furthermore, when the third transistor conducts, the timing capacitor charges with the supply potential at one of its terminals and substantially ground potential at its other terminal. Thus, the charge stored by the timing capacitor during the stable state is determined by the supply voltage and is independent of transistor parameters and, consequently, temperature changes. Thus, a constant unstable state duration is realized in employing this monostable multivibrator.

The invention will be described with reference to the accompanying drawings, wherein:

FIGURE 1 is a circuit diagram of an embodiment of this invention; and

Figure 2:
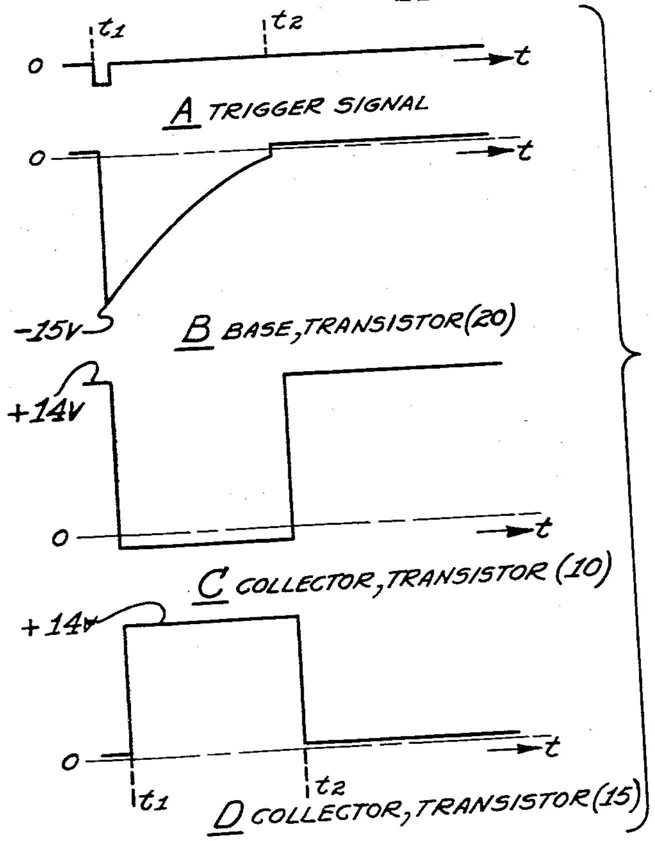

FIGURE 2 includes graphs for explaining the operation of the circuit of FIG. 1.

The monostable multivibrator of FIG. 1 comprises a transistor 10 having a base electrode 11, an emitter electrode 12, and a collector electrode 13; a transistor 15 having a base electrode 16, an emitter electrode 17, and a collector electrode 18; and a transistor 20 having a base electrode 21, an emitter electrode 22, and a collector electrode 23. In the preferred embodiment of this invention, transistors 10, 15, and 20 are junction transistors. These transistors may be of materials such as germanium and silicon, although it is presently preferred that transistor 20 be composed of silicon because of its higher base input impedance in the state of low conduction. Although the embodiment of FIG. 1 is shown employing n-p-n transistors, the circuit could equally well employ p-n-p transistors wherein potentials at all terminals are of opposite polarity, and the trigger signal is of opposite polarity.

The positive and negative terminals of a potential or current source, not shown, are connected to the respective terminals 30 and 31. A resistor 32 is connected between terminal 30 and collector electrode 13. A resistor 33 is connected between terminal 30 and collector electrode 18. Emitters 12 and 17 are connected together at a common connection point 34. A pair of resistors 35 and 36 are connected in series between connection point 34 and terminal 31.

A pair of resistors 38 and 39, which are connected together at a common connection point 40, are coupled in series between ground, which is at zero potential, and terminal 31. The values of resistors 38 and 39 are selected so that connection point 40, which is connected to base electrode 11, is maintained at a D.-C. potential of approximately −1 volt. The potential of connection point 40 must be sufficiently negative with respect to ground to maintain transistor 10 in its condition of low conduction when transistor 15 is in its condition of high conduction.

Emitter electrode 22 is connected to base electrode 16. Collector electrode 23 is connected to ground. A potentiometer 42 and a fixed resistor 43 are connected in series between terminal 30 and ground.

A resistor 44 is connected between base electrode 21 and the movable arm of potentiometer 42. Resistor 44 may be referred to as the "timing resistor," since it represents one of the most significant parameters which determine the duration of the unstable state of the circuit. A capacitor 45 is connected between collector electrode 13 of transistor 10 and base electrode 21 of transistor 20. Capacitor 45 may be referred to as the "timing capacitor," since it represents one of the most significant parameters which determine the duration of the unstable state of the circuit.

When transistor 15 is in its condition of high conduction, the emitter electrode potential thereof is approximately −0.1 v., so that the emitter junction of transistor 10 is reverse biased, whereby transistor 10 is forced to operate in its condition of low or zero conduction. This type of operation of the circuit of FIG. 1 is the stable state. Transistor 10 can, therefore, only operate in the condition of high conduction when transistor 15 is in its condition of low conduction.

When transistor 10 is in its condition of high conduction, the emitter electrode potential thereof is approximately −1.1 v. Transistor 10 can only continue in its condition of high conduction so long as the base electrode 21 of transistor 20 is held to a potential more negative than −1.1 v. This type of operation of the circuit is the unstable state. The circuit is maintained in its unstable state only so long as the charge on capacitor 45 is greater than a predetermined value. When the potential of base electrode 21 becomes more positive than −1.1 v., transistor 20, and consequently transistor 15, immediately switch to the condition of high conduction, thereby driving transistor 10 to its condition of low conduction.

The detailed operation of the embodiment of FIG. 1 will now be described with reference to the waveforms shown in FIG. 2. In the stable state, transistor 20 is conducting in a saturated condition. In this condition, the collector junction becomes forward biased, so that base electrode 21 is slightly positive with respect to collector electrode 23. Since collector electrode 23 is grounded, the potential of base electrode 21 is approximately +0.1 v. This collector junction acts as a diode, clamping the base electrode 21 to this value of +0.1 v. so long as transistor 20 conducts. Thus, base electrode 21 acts as a reference potential point for the remainder of the circuit in the stable state of operation. In this state, the emitter junction of transistor 20 is also forward biased, so that emitter electrode 22 is slightly negative with respect to base electrode 21. Therefore, emitter electrode 22 operates at approximately ground or zero potential in the stable state.

The base current drawn by transistor 20 is amplified and the resulting emitter current flows as base current through transistor 15. This base current drawn by transistor 15 causes it to operate in its condition of high conduction, whereby emitter electrode 17 and connection point 34 are slightly negative with respect to base electrode 16, and assume a potential of approximately −0.1 v. A reverse bias is therefore applied to the emitter junction of transistor 10, whereby emitter electrode 12 is approximately 0.9 v. positive with respect to base electrode 11. Therefore, transistor 10 is maintained in its condition of low conduction.

The typical voltages of the base electrode of transistor 20, the collector electrode of transistor 10, and the collector electrode of transistor 15 are shown respectively in waveforms B, C, and D of FIG. 2. Stable state voltages are shown to the left of time $t_1$. The voltage values of these waveforms are based upon a typical value of +14 v. being applied to terminal 30 and −14 v. being applied to terminal 31 from the potential source. Thus, in the stable state, the base electrode of transistor 20 is but slightly positive with respect to ground. Transistor 10 is in its condition of low conduction and very low current, if any, is drawn by the collector 13 thereof. The voltage of collector 13 is approximately equal to the potential applied to terminal 30. Transistor 15 is in its condition of high conduction and the collector electrode 18 thereof is approximately at ground potential. One terminal of timing capacitor 45 is coupled at collector electrode 13 to the potential source voltage and the other terminal is coupled at base electrode 21 to the reference potential of +0.1 v. Therefore, in the stable state, the timing capacitor charges through resistor 32 to a potential of approximately 13.9 v.

The multivibrator is transferred from its stable to its unstable state by application of a negative trigger signal thereto. A negative pulse of approximate amplitude 1.5 v., or greater, is applied to input terminal 50 at time $t_1$ (waveform A). A capacitor 51 is coupled between terminal 50 and a connection point 52. A resistor 55 is coupled between connection point 52 and terminal 30. A diode 56 is coupled between collector electrode 13 and connection point 52. Diode 56 is shown by its conventional symbol, the direction of the arrow indicating the direction of flow of conventional current, which in this instance is from collector electrode 13 to connection point 52. Preferably diode 56 is a semi-conductor diode, and may be of germanium or silicon.

Capacitor 51 and resistor 55 function to differentiate the trigger pulse applied to terminal 50. When the trigger pulse is differentiated, a sharp negative pulse is provided by the leading edge thereof. This sharp negative pulse is transmitted by diode 56 and timing capacitor 45 to base electrode 21. Diode 56 prevents further signals following the negative pulse from influencing operation of the circuit once it has been triggered into its unstable state.

The application of this sharp negative pulse to base electrode 21 momentarily acts to stop conduction in transistor 20, and, consequently, in series-connected transistor 15. Emitter electrode 12 is no longer held at −0.1 v. by emitter electrode 17, and transistor 10 becomes free to conduct. As current begins flowing through resistor 32 to collector electrode 13, the potential of collector electrode 13, and of the corresponding terminal of timing capacitor 45 drops. Inasmuch as the charge on capacitor 45 cannot change instantaneously, the potential drop of collector electrode 13 is transmitted to base 21 and serves to maintain transistor 21 nonconducting when the trigger signal terminates. Transistor 10 assumes a condition of high conduction or staturation as determined by resistors 32, 35, 36 and the bias on base electrode 11. Emitter electrode 12 operates at a voltage slightly negative with respect to base electrode 11; i.e., approximately −1.1 v. Collector electrode 13 is slightly positive with respect to emitter electrode 12 so that the corresponding terminal of capacitor 45 operates at approximately −1.0 v. in this unstable state. Since capacitor 45 had stored therein a potential of approximately 14 volts in the stable state and because collector electrode 13 changes in potential from +14 v. to −1.0 v., the potential of base electrode 21 is driven to approximately −15 v. to time $t_1$.

Circuit potentials in the unstable state are shown in the waveform portions lying between times $t_1$ and $t_2$ in FIG. 2. As transistor 15 is nonconducting, the collector electrode potential thereof rises to the source potential and is maintained at that value until return of the circuit to the stable state. A positive output pulse of variable duration, depending on the length of time that the circuit remains in its unstable state, may be derived from a terminal 60, which is connected to collector electrode 18.

The circuit remains in its unstable state so long as base electrode 21 is negative with respect to emitter electrode 12. Capacitor 45 discharges exponentially through the path provided by collector electrode 13 of transistor 10 and resistor 44. The potential level set at the movable arm of potentiometer 42 influences the rate of discharge of capacitor 45, and, consequently, the duration of the circuit in its unstable state. Diode 56 is reverse biased so that no current can flow therethrough.

At time $t_2$ capacitor 45 has discharged sufficiently so that the potential of base electrode 21 has reached that of emitter electrode 12 (−1.1 v.). Transistor 20 thereupon commences conducting and the circuit transfers to its stable state of operation. Emitter electrode 22 commences drawing current, which is amplified by transistor 15. The potential of connection point 34 increases positively, thereby decreasing the current drawn by transistor 10. The voltage of collector electrode 13 rises and is coupled through capacitor 45 to increase the voltage and, therefore, the current of base electrode 21. This regenerative action continues until transistor 20 is operating saturated. At this time, the circuit is in its stable state. Capacitor 45 charges to its normal stable state value through resistor 32 and transistor 20. Inasmuch as resistor 32 is very much lower in value than timing resistor 44, capacitor 45 charges to its steady state value in an interval small compared to its discharge duration.

As mentioned previously, this circuit allows the employment of a very high value of timing resistor 44, and the consequent large duty cycles which may be obtained therewith. First, the high input impedance of the grounded collector electrode transistor, which is in parallel with resistor 44, does not diminish the effectiveness of resistor 44 in controlling the duration of the unstable state. Second, the tandem current gain of transistors 20 and 15 permits relatively small currents to flow in the base electrode 21 of transistor 20 when the circuit is in the stable state. Thus, the small base electrode currents obtained when high values of resistor 44 are employed do not tend to cause highly conducting transistor 15 to become nonconducting in the stable state.

Another advantage realized by this circuit arises from the fact that both terminals of timing capacitor 45 are connected to stable potential points when the circuit is in the stable state. One capacitor terminal is connected to the potential of the source and the other terminal is connected to the reference potential of transistor base electrode 21. Therefore, the charge produced on capacitor 45 during the stable state is substantially independent of variation of transistor parameters with temperature. A constant unstable state duration is thereby achieved in this multivibrator.

Other advantages accrue because the tandem current gain obtained from the series-connected transistors 20 and 15 allows the employment of lower power in the trigger signal.

A resistor 62 is connected between base electrode 16 and the common junction point of resistors 35 and 36. Resistor 62 forces transistor 15 to be cut off when transistor 20 is cut off and thereby prevents the collector leakage current, $I_{co}$, of transistor 15 from being amplified. In the absence of resistor 62, the collector leakage current, $I_{co}$, of transistor 15 would be amplified by the open base current gain of transistor 15. The resulting emitter current into connection point 34 would increase with temperature and when it became sufficiently large, transistor 10 would no longer saturate. Therefore, the voltage swing of collector electrode 13 would be less than 15 v. and the duration of the unstable state would decrease. Resistor 62 serves to apply a bias to positively cut off transistor 15 and to thereby eliminate amplification of leakage current and prevent a timing change at high temperatures due to failure to saturate transistor 10.

The parameters and operating characteristics of one embodiment of this invention will now be described. In this embodiment, the following circuit elements were employed:

| | |
|---|---|
| Transistors 10 and 15 | 2N123. |
| Transistor 20 | CK791 (silicon). |
| Diode 56 | 1N497. |
| Resistor 32 | 3900 ohms. |
| Resistor 33 | 2700 ohms. |
| Resistors (35+36) | 2700 ohms. |
| Resistor 38 | 270 ohms. |
| Resistor 39 | 3300 ohms. |
| Potentiometer 42 | 5000 ohms. |
| Resistor 43 | 10,000 ohms. |

| | |
|---|---|
| Resistor **44** | 1,000,000 ohms. |
| Resistor **55** | 10,000 ohms. |
| Capacitor **45** | 0.05 μf. |
| Capacitor **51** | 0.001 μf. |

Resistor 62 was not employed in this embodiment and one resistor of 2700 ohms replaced resistors 35 and 36.

The following wide range of duty cycles were obtained by varying the trigger signal recurrence rate:

| Duty cycle, percent of time in unstable state: | Duration of unstable state in milliseconds |
|---|---|
| 63 | 34.87 |
| 70 | 34.87 |
| 83 | 34.84 |
| 93 (maximum) | 34.81 |

Adjustment of potentiometer 42 caused the duration of the unstable state to range between 35–43 milliseconds.

The temperature of the transistors was varied and the duration of the unstable state remained substantially constant as follows:

| Temperature, degrees C.: | Duration of the unstable state in milliseconds |
|---|---|
| 43 | 34.89 |
| 55 | 34.88 |
| 65 | 34.89 |
| 46 | 34.90 |
| 35 | 34.92 |

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A monostable multivibrator circuit comprising first, second and third transistors, each having emitter, collector and base electrodes, said transistors being biased for operation so that said first transistor is in a condition of relatively low conduction and said second and third transistors are each in a condition of relatively high conduction when said circuit is in its stable operating state in the absence of a signal applied to said circuit, means for applying a trigger signal to said circuit for triggering said first transistor to a condition of relatively high conduction, a capacitor connected between the collector electrode of said first transistor and the base electrode of said third transistors for maintaining said third transistor in a condition of relatively low conduction for a predetermined duration after said first transistor is triggered to said high conduction condition, means for maintaining said first transistor in said high conduction condition so long as said second transistor remains in a condition of relatively low conduction, and means responsive to the conduction condition of said third transistor for maintaining said second transistor in a corresponding condition of conduction, said third transistor switching to said high conduction condition at the end of said duration.

2. A monostable multivibrator circuit comprising first, second and third transistors, each having emitter, collector and base electrodes; said transistors being so biased for operation that said first transistor is in a condition of relatively low conduction, said second transistor is in a condition of relatively high conduction, and said third transistor is saturated, when said circuit is in its stable operating state in the absence of a signal applied to said circuit; means for applying a trigger signal to said circuit for triggering said first transistor to a condition of saturation, a capacitor connected between the collector electrode of said first transistor and the base electrode of said third transistor for maintaining said third transistor in a condition of relatively low conduction for a predetermined duration after said first transistor is triggered to saturation, means for maintaining said first transistor saturated so long as said second transistor remains in a condition of relatively low conduction, and means responsive to the low conduction condition of said third transistor for maintaining said second transistor in a corresponding condition of low conduction, said third transistor switching to said high conduction condition at the end of said duration.

3. In combination first, second and third transistors each having emitter, collector and base electrodes, first electric circuit means for connecting said first and second transistors to a source of electric current and so arranged that said first transistor is maintained in a condition of low conduction only when said second transistor is in a condition of high conduction, means for connecting the emitter electrode of said third transistor to the base electrode of said second transistor and so arranged that the condition of conduction of said second transistor corresponds with the condition of conduction of said third transistor, second electric circuit means for connecting said third transistor to a source of current and so arranged that said third transistor is normally maintained in high conduction in the absence of a signal applied to said circuit, a capacitor, means including said capacitor for electrically connecting the base electrode of said third transistor to the collector electrode of said first transistor, means for discharging said capacitor when said third transistor is in a condition of low conduction, and means for applying a signal to momentarily drive said third transistor to said condition of low conduction, said third transistor remaining in said low conduction condition for a predetermined duration as determined by the discharge period of said capacitor, said third transistor switching back to said high conduction condition at the end of said duration.

4. In combination, first, second and third transistors each having emitter, collector and base electrodes, electric circuit means for connecting a source of electric current to all of said transistors and for interconnecting one of said electrodes of each of said first and second transistors and so arranged that the operation of said second transistor in a condition of high conduction holds said first transistor in a condition of low conduction and that said first transistor operations in its condition of high conduction when said second transistor is in its condition of low conduction, means for connecting the emitter electrode of said third transistor to the base electrode of said second transistor, a capacitor having a pair of terminals, one of said capacitor terminal being connected to the base electrode of said third transistor, and the other of said capacitor terminals being connected to the collector electrode of said first transistor, a resistor having a pair of terminals, means for connecting said one of said resistor terminals to said one capacitor terminal and the other of said resistor terminals to said source, said transistors being biased for operation whereby said third transistor is in a condition of high conduction in the absence of a signal applied to said circuit, and means for applying a signal to momentarily drive said third transistor to a condition of low conduction, said third transistor remaining in said low conduction condition for a predetermined duration and then switching back to said condition of high conduction at the end of said duration.

5. A combination as in claim 4 further including a reference potential source and means for connecting the collector electrode of said third transistor to said reference potential source.

6. In combination, first, second and third transistors, electric circuit means for connecting a source of current to said first and second transistors, means including said third transistor for connecting an electrode of said second transistor to said source and so arranged that the condition of conduction of said second transistor corresponds with the condition of conduction of said third transistor, a source of biasing potential, means for connecting said biasing potential source to said first transistor to maintain said first transistor in a condition of low conduction only when said second transistor is in a condition of high conduction, said first transistor normally being in said condition of low conduction with no signal applied to said circuit, storage means for storing a signal provided when said first transistor is in said low conduction condition, said storage means being connected between one electrode of said first transistor and one electrode of said third transistor, means for momentarily applying a signal to drive said third transistor to a condition of low conduction, whereby said storage means maintains said third transistor in said condition of low conduction so long as the signal stored therein remains greater than a predetermined level, and means coupled to said storage means for reducing the signal stored therein to a value less than said predetermined level at a controllable time following the time when said third transistor is driven to said low conduction condition, said third transistor reverting to the condition of high conduction at said controllable time.

7. A monostable multivibrator comprising first, second and third transistors each having emitter, collector and base electrodes, a source of electrical potential having a pair of terminals, means for electrically connecting the collector electrodes of said first and second transistors to one of said source terminals, means for electrically connecting the emitter electrodes of said first and second transistors to the other of said source terminals, a source of biasing potential, means for electrically connecting said biasing source to said first transistor for maintaining said first transistor in a condition of low conduction only when said second transistor is in a condition of high conduction, said first transistor normally being in said condition of low conduction with no signal applied to said circuit, means for electrically connecting the emitter electrode of said third transistor to the base electrode of said second transistor, a resistor, means including said resistor for electrically connecting the base electrode of said third transistor to said one source terminal, a capacitor, means including said capacitor for electrically connecting the collector electrode of said first transistor to the base electrode of said third transistor, a connection point for providing an electrical potential intermediate that provided by said source terminals, means for electrically connecting the collector electrode of said third transistor to said connection point, and means for applying a signal to said third transistor to momentarily drive said third transistor from saturated conduction to a condition of low conduction, said third transistor remaining in said condition of low conduction for a predetermined period and then reverting to said saturated conduction condition.

8. A monostable multivibrator comprising first, second and third transistors each having emitter, collector and base electrodes, a source of electrical potential having a pair of terminals, first and second resistors, means including said first resistor for electrically connecting the collector electrode of said first transistor to one of said source terminals, means including said second resistor for electrically connecting the collector electrode of said second transistor to said one source terminal, a common terminal, a third resistor, means including said third resistor for electrically connecting the other of said source terminals to said common terminal, means for electrically connecting the emitter electrodes of said first and second transistors to said common terminal, means for electrically connecting the emitter electrode of said third transistor to the base electrode of said second transistor, a fourth resistor, means including said fourth resistor for electrically connecting the base electrode of said third transistor to said one source terminal, a capacitor, means including said capacitor for electrically connecting the collector electrode of said first transistor to the base electrode of said third transistor, a connection point for providing an electrical potential intermediate that provided by said source terminals, means for electrically connecting the collector electrode of said third transistor to said connection point, a source of biasing potential, means for electrically connecting the base electrode of said first transistor to said biasing source, said biasing source being adapted to hold said first transistor in a condition of low conduction only when said second transistor is in a condition of high conduction, said first transistor normally being held in said condition of low conduction in the absence of a signal applied to said circuit, and means for applying a signal to said third transistor to momentarily drive said third transistor to a condition of low conduction, said third transistor remaining in said condition of low conduction for a predetermined duration and then switching back to condition of high conduction.

9. A monostable multivibrator comprising first, second and third transistors each having emitter, collector and base electrodes, a source of electrical potential having a pair of terminals, means for electrically connecting the collector electrodes of said first and second transistors to one of said source terminals, means for electrically connecting the emitter electrodes of said first and second transistors to the other of said source terminals, a source of biasing potential, means for electrically connecting said biasing source to said first transistor whereby said first transistor is maintained in its non-conducting state only when said second transistor is in a condition of high conduction, said first transistor being normally maintained in its non-conducting state in the absence of a signal applied to said circuit, means for electrically connecting the emitter electrode of said third transistor to the base electrode of said second transistor, a resistor, means including said resistor for electrically connecting the base electrode of said third transistor to said one source terminal whereby said third transistor is normally saturated, a capacitor, means including said capacitor for electrically connecting the collector electrode of said first transistor to the base electrode of said third transistor, a connection point for providing an electrical potential intermediate that provided by said source terminals, means for electrically connecting the collector electrode of said third transistor to said connection point, and means for applying a signal to said third transistor to momentarily drive said third transistor to its non-conducting state, said third transistor remaining in its non-conducting state for a predetermined duration and then switching back to its conducting state.

10. A monostable multivibrator circuit as defined in claim 9 and further including unidirectional conducting means connected between said capacitor and said signal applying means for preventing any other signal from being applied to said circuit when said third transistor is driven to its non-conducting state.

11. A monostable multivibrator circuit as defined in claim 10 wherein said unilateral conducting means comprises a diode poled in the reverse direction with respect to a signal having a polarity opposite to said signal for driving said third transistor to its non-conducting state.

References Cited in the file of this patent

UNITED STATES PATENTS

| | | |
|---|---|---|
| 2,442,769 | Kenyon | June 8, 1948 |
| 2,545,924 | Johnstone | Mar. 20, 1951 |
| 2,641,717 | Toth | June 9, 1953 |

(Other references on following page)

UNITED STATES PATENTS

| | | |
|---|---|---|
| 2,778,935 | Ropiequet | Jan. 22, 1957 |
| 2,784,309 | Sable | Mar. 5, 1957 |
| 2,787,712 | Priebe | Apr. 2, 1957 |
| 2,827,574 | Schneider | Mar. 18, 1958 |
| 2,831,113 | Weller | Apr. 15, 1958 |
| 2,842,683 | Clapper | July 8, 1958 |
| 2,846,583 | Goldfischer | Aug. 5, 1958 |

OTHER REFERENCES

"Junction Transistor Switching Circuits for High Speed Digital Computer Applications," by G. J. Prom and R. L. Crosby, published in March 1956; pages 9–12.

"Transistor Flip-Flops of Digital Computers," by A. K. Rapp and S. Y. Yong, published in Electronic Buyers Guide, June 1957, pages R–24 and 25.